United States Patent
Uemura et al.

(10) Patent No.: US 7,879,124 B2
(45) Date of Patent: Feb. 1, 2011

(54) AIR CLEANER AND METHOD OF MANUFACTURING THE SAME

(75) Inventors: Soichi Uemura, Shizuoka (JP); Wataru Sugimoto, Shizuoka (JP)

(73) Assignee: Toyo Roki Seizo Kabushiki Kaisha, Shizuoka (JP)

( * ) Notice: Subject to any disclaimer, the term of this patent is extended or adjusted under 35 U.S.C. 154(b) by 601 days.

(21) Appl. No.: 11/522,914

(22) Filed: Sep. 19, 2006

(65) Prior Publication Data

US 2007/0209517 A1    Sep. 13, 2007

(30) Foreign Application Priority Data

Sep. 21, 2005  (JP)  ............... 2005-274180
Sep. 7, 2006   (JP)  ............... 2006-242890

(51) Int. Cl.
    *B01D 39/00* (2006.01)
(52) U.S. Cl. .............. 55/506; 55/502; 55/503; 55/DIG. 31; 96/135; 156/73.5
(58) Field of Classification Search ............ 96/134, 96/135, 147, 138; 95/146; 55/385.3, 495, 55/511, 503, DIG. 31, 478, 481, 506; 123/518; 156/73.5, 73.6
    See application file for complete search history.

(56) References Cited

U.S. PATENT DOCUMENTS

| | | | | |
|---|---|---|---|---|
| 3,430,771 A | * | 3/1969 | Dreher | ............ 210/323.1 |
| 3,685,239 A | * | 8/1972 | McCurdy et al. | ............ 52/172 |
| 4,187,182 A | * | 2/1980 | Rosenberg | ............ 210/445 |
| 5,639,287 A | * | 6/1997 | Van de Graaf et al. | ...... 55/385.3 |
| 6,592,655 B2 | * | 7/2003 | Iriyama et al. | ............ 96/138 |
| 7,473,306 B2 | * | 1/2009 | Uemura et al. | ............ 96/134 |
| 2002/0129711 A1 | * | 9/2002 | Oda et al. | ............ 96/134 |

FOREIGN PATENT DOCUMENTS

| JP | 05049967 | * | 3/1993 |
|---|---|---|---|
| JP | 2002-266713 | | 9/2002 |

* cited by examiner

*Primary Examiner*—Jason M Greene
*Assistant Examiner*—Karla Hawkins
(74) *Attorney, Agent, or Firm*—Wenderoth, Lind & Ponack L.L.P.

(57) ABSTRACT

There is provided an air cleaner in which an adsorption element for adsorbing vaporized fuel is surely fixed to a housing without additionally providing a special step, and moreover the performance of element and the performance of an air cleaner itself can be maintained, and a manufacturing method for the air cleaner. The air cleaner is configured so that a filter element and an adsorption element for adsorbing vaporized fuel are incorporated in a housing formed by joining the open ends of a pair of housing members to each other. At the open end of each of the housing members, a welding protrusion projecting toward the open end on the other side is formed, and a connecting portion formed with a welding protrusion is provided on a holding frame of the adsorption element.

9 Claims, 6 Drawing Sheets

AIR CLEANER AND METHOD OF MANUFACTURING THE SAME

BACKGROUND OF THE INVENTION

1. Field of the Invention

The present invention relates to an air cleaner that filters air flowing in an air intake system of an internal combustion engine and a method for manufacturing the same.

2. Description of the Related Art

In an internal combustion engine, evaporated fuel sometimes flows from the engine side into an air cleaner. In the conventional air cleaner, in order to adsorb the vaporized fuel, an adsorbent has been provided in the air cleaner in addition to a filter element. This adsorbent is preferably fixed in the air cleaner to prevent the adsorbent from being removed by the user.

As one example of such a technique, an air cleaner disclosed in Japanese Patent Laid-Open No. 2002-266713 is available. The air cleaner disclosed in this publication has a filter element provided so as to partition the interior of a housing into the clean side and the dust side. A plate-shaped adsorption element provided with an adsorbent is provided in parallel with the filter element. Also, on the inner surface of the housing, an inner flange projecting toward the center side so as to be parallel with the filter element is formed throughout the entire periphery. On one surface side of the inner flange, welding pins are formed. On the other hand, the adsorption element has a frame at the peripheral edge thereof. In this frame, insertion holes are formed at positions corresponding to the welding pins formed on the inner flange.

The adsorption element is attached to the housing by inserting the welding pins into the insertion holes formed in the frame of the adsorption element, collapsing the tip ends of the welding pins projecting from the surface of the frame by heating, and staking the frame by the welding pins.

However, in the technique disclosed in the aforementioned publication, it is necessary to provide a step of fixing the adsorption element. Moreover, since this step involves work in the housing, the step takes much time and effort.

In addition, in the attaching step, the adsorption element is adversely affected by heat for heating the pins, and also melt residues melting out from the tip ends of the pins at the time of heating may be generated.

SUMMARY OF THE INVENTION

Accordingly, an object of the present invention is to provide an air cleaner in which an adsorption element provided with an adsorbent is surely fixed to a housing without additionally providing a special step, and moreover the performance of element and the performance of an air cleaner itself can be maintained, and a manufacturing method for the air cleaner.

To achieve the above object, firstly, the present invention adopts an air cleaner described below.

In an air cleaner (1) including a housing (1A), the housing (1A) consisting of a pair of housing members (2, 20) each formed with an open end, and being configured so that the open ends are closed by being joined to each other; and a filter element (60) for filtering air taken into the housing (1A), the filter element (60) being assembled so as to partition the interior of the housing (1A) into regions of the housing members (2, 20), in the housing (1A), an adsorption element (40) for adsorbing vaporized fuel flowing in from the engine side is further arranged on either one side of the housing members (2, 20) so as to face to the filter element (60), the adsorption element including an adsorbent (41) for adsorbing the vaporized fuel and a holding frame (42) for holding the outer peripheral edge of the adsorbent (41); at the open end of each of the housing members (2, 20), a welding protrusion (12, 29) which projects toward and abuts on the open end on the other side is provided; on the holding frame (42), a connecting portion (46) is provided in which a welding protrusion (47) abutting on the welding protrusion (29) of the housing member (20) on the reverse side to the side on which the adsorption element (40) is arranged via the filter element (60) is formed; and the welding protrusions (12, 29) of both of the housing members (2, 20) abut on each other, and the welding protrusion (47) formed in the connecting portion (46) abuts on the welding protrusion (29) of the housing member (20) located on the reverse side to the adsorption element (40), whereby the welding protrusions are vibration welded so that the housing (1A) and the adsorption element (40) are formed integrally.

In the air cleaner (1) in accordance with the present invention, the welding protrusions (12, 29) of the housing members (2, 20) and the welding protrusion (47) of the adsorption element (40), which are welded and integrated, are formed so as to extend along the welding protrusions (12, 29, 47) with a predetermined distance being provided on the inside and the outside, and are surrounded by wall portions (11, 48) for preventing burrs produced by vibration welding of the welding protrusions (12, 29, 47) from scattering.

Also, in the air cleaner (1) in accordance with the present invention, at the open end of each of the housing members (2, 20), a flange portion (8, 26) is formed which projects to the outside and is lapped mutually, and the welding protrusion (12, 29) of each of the housing members (2, 20) is formed on the surface on which the flange portions (8, 26) face to each other.

In the above-described air cleaner (1), in either one of the flange portions (8, 26), an outside wall portion (11) is formed at a position separating a predetermined distance from the welding protrusions (12, 29, 47) on the outside of the welding protrusions (12, 29) of the housing members and the welding protrusion (47) of the adsorption element, which are welded and integrated, the outside wall portion (11) projecting toward the other flange portion (8, 26) and preventing burrs from scattering; on the holding frame (42) of the adsorption element (40), an inside wall portion (48) is formed at a position separating a predetermined distance from the welding protrusions (12, 29, 47) on the inside of the welding protrusions (12, 29) of the housing members and the welding protrusion (47) of the adsorption element, which are welded and integrated, the inside wall portion (48) projecting toward the flange portion (26) of the housing member (20) on the reverse side to the housing member (2) on which the adsorption element (40) is arranged, and preventing burrs produced by vibration welding of the welding protrusions (12, 29, 47) from scattering; and the outside wall portion (11) surrounds the outside of the welding protrusions, whereby a space is formed which is closed by the outside wall portion (11), the welding protrusions (12, 29, 47), and the flange portions (8, 26), and the inside wall portion (48) surrounds the inside of the welding protrusions, whereby a space is formed which is closed by the inside wall portion (48), the welding protrusions (12, 29, 47), the connecting portion (46) of the holding frame, and the flange portion (26).

Further, in the above-described air cleaner (1), in the vicinity of the open end of each of the housing members (2, 20), a projecting portion (5, 23) formed by projecting the peripheral wall surface (3, 21) of the housing member (2, 20) to the outside is formed, the projecting portion (5, 23) is formed by a horizontal surface (6, 24) extending from the peripheral wall surface (3, 21) toward the outside and a vertical surface (7, 25) extending toward the housing member (2, 20) on the other side at the outside edge of the horizontal surface (6, 24), and the projecting portions (5, 23) are combined and the interior there of is configured as an insertion portion in which the peripheral edge portion of the filter element (60) is inserted; the flange portion (8, 26) is formed at the tip end of the vertical surface (7, 25); the holding frame (42) of the adsorption element (40) is formed so that a bent surface (45) formed by bending the outer peripheral edge thereof is formed along the peripheral direction of the adsorption element (40) and is in close contact with the inner surface of the projecting portion (5, 23); and at the tip end of the bent surface (45), the connecting portion (46) which projects further outward and is formed with the welding protrusion (47) at the tip end thereof and the inside wall portion (48) which extends toward the flange portion (26) of the housing member (20) on the inside of the welding protrusion (29) of the housing member (20) on the reverse side to the side on which the adsorption element (40) is arranged are formed.

Also, in the above-described air cleaner (1) in accordance with the present invention, in the vicinity of the open end of each of the housing members (2, 20), a projecting portion (5, 23) formed by projecting the peripheral wall surface (3, 21) of the housing member (2, 20) to the outside is formed, the projecting portion (5, 23) is formed by a horizontal surface (6, 24) extending from the peripheral wall surface (3, 21) toward the outside and a vertical surface (7, 25) extending toward the housing member (2, 20) on the other side at the outside edge of the horizontal surface (6, 24), and the projecting portions (5, 23) are combined and the interior thereof is configured as an insertion portion in which the peripheral edge portion of the filter element (60) is inserted; the flange portion (8, 26) is formed at the tip end of the vertical surface (7, 25); the holding frame (42) of the adsorption element (40) is formed so that a bent surface (45) formed by bending the outer peripheral edge thereof is formed along the peripheral direction of the adsorption element (40) and is in close contact with the inner surface of the projecting portion (5); and at the tip end of the bent surface (45), the connecting portion (46) which projects further outward and is formed with the welding protrusion (47) at the tip end thereof and the inside wall portion (48) which extends toward the flange portion (26) of the housing member (20) on the inside of the welding protrusion (29) of the housing member (20) on the reverse side to the side on which the adsorption element (40) is arranged are formed.

In the present invention, in the housing member (102) in which the adsorption element (140) is arranged, a support member (180) which is lapped on the adsorption element (140) and supports the adsorbent (141) is provided so as to be located on the interior side of the adsorption element (140).

In this case, at a peripheral edge (181) of the support member (180), a welding protrusion (187) projecting toward the housing member (120) on the reverse side to the housing member (102) in which the support member (180) is arranged is formed, and the welding protrusion is configured by being held between the welding protrusion (112) formed on the housing member (102) in which the support member (180) is arranged and the welding protrusion (147) formed on the holding frame (142) of the adsorption element (140).

Also, to achieve the above-described object, secondly, the present invention adopts a manufacturing method for an air cleaner (1) described below.

In a manufacturing method for an air cleaner (1), including the steps of forming a housing (1A) by joining open ends of a pair of housing members (2, 20) formed with the open end and by closing the open ends; attaching an adsorption element (40) into the housing (1A), the adsorption element (40) including an adsorbent (41) for adsorbing vaporized fuel and a holding frame (42) for holding the outer peripheral edge of the adsorbent (41) to adsorb the vaporized fuel flowing in from the engine side; and assembling a filter element (60) for filtering air so as to partition the interior of the housing (1A) into regions of the housing members (2, 20), at the open end, a welding protrusion (12, 29) that projects toward and abuts on the open end on the other side is provided, and further on the holding frame (42), a connecting portion (46) is provided in which a welding protrusion (47) abutting on the welding protrusion (12, 29) of the housing member (2, 20) is formed; in the housing forming step and the adsorption element attaching step, the adsorption element (40) is fitted in one of the housing members (2, 20) from the open end; the welding protrusion (12) of one housing member (2) in which the adsorption element (40) is fitted and the welding protrusion (47) of the adsorption element (40) is caused to abut on the welding protrusion (29) of the other housing member (20); and then, one housing member (2) in which the adsorption element (40) is fitted and the other housing member (20) are vibrated relatively in the direction in which both of the housing members (2, 20) slide while a force which presses the housing members (2, 20) against each other is applied, whereby the housing (1A) and the adsorption element (40) are formed integrally by vibration welding at the same time.

In the above-described manufacturing method, in one housing member (102) in which the adsorption element (140) is fitted, a support member (180) for supporting the adsorbent (141) of the adsorption element (140) is located on the interior side of the adsorption element (140), and the adsorption element (140) and the support member (180) are lapped on each other and are fitted in one housing member (102); and a welding protrusion (187) which is formed at the peripheral edge of the support member (180) and extends toward the welding protrusion (129) of the other housing member (120) is held between the welding protrusion (112) of one housing member (102) and the welding protrusion (147) of the adsorption element (140), and in this state, the welding protrusion (112) of the one housing member (102), the welding protrusion (187) of the support member (180), and the welding protrusion (147) of the adsorption element (140) are caused to abut on the welding protrusion (129) of the other housing member (120), whereby these welding protrusions are vibration welded at the same time.

In the present invention, three members of the paired housing members and the adsorption element are welded in one step of the vibration welding step. Therefore, there is no need for separately providing a step for attaching the adsorption element to the housing members, so that an air cleaner provided with the adsorption element can be manufactured efficiently. Moreover, since the adsorption element is vibration welded to the housing, the construction can be made such that the adsorption element cannot be removed easily.

When vibration welding is performed, burrs are produced from the welding protrusions. In the present invention, the wall portions are formed on the inside and outside of the welding protrusion of the housing and the connecting portion of the adsorption element to confine burrs. Therefore, burrs do not intrude into the air cleaner, so that the adsorption element and the engine are not damaged. Therefore, the performance and quality of air cleaner can be maintained.

Further, by providing the support member, the adsorbent of the adsorption element can be prevented from being deflected to the downstream side of the flow of air. Since the deflection of adsorbent can be prevented by the provision of support member, the adsorbent can be formed so as to be thin. Further, since the adsorbent is thin, the airflow resistance of air passing through the adsorbent is reduced. Therefore, on the downstream side of the filter element, the adsorption element can be provided so as to cover the transverse section in the housing in almost the whole region. If the adsorption element is provided in such a manner, vaporized fuel flowing into the housing can be adsorbed surely, and therefore the vaporized fuel can be prevented effectively from leaking to the upstream side.

DETAILED DESCRIPTION OF THE INVENTION

Embodiments of the present invention will now be described with reference to the accompanied drawings.

First Embodiment

Figure 1:
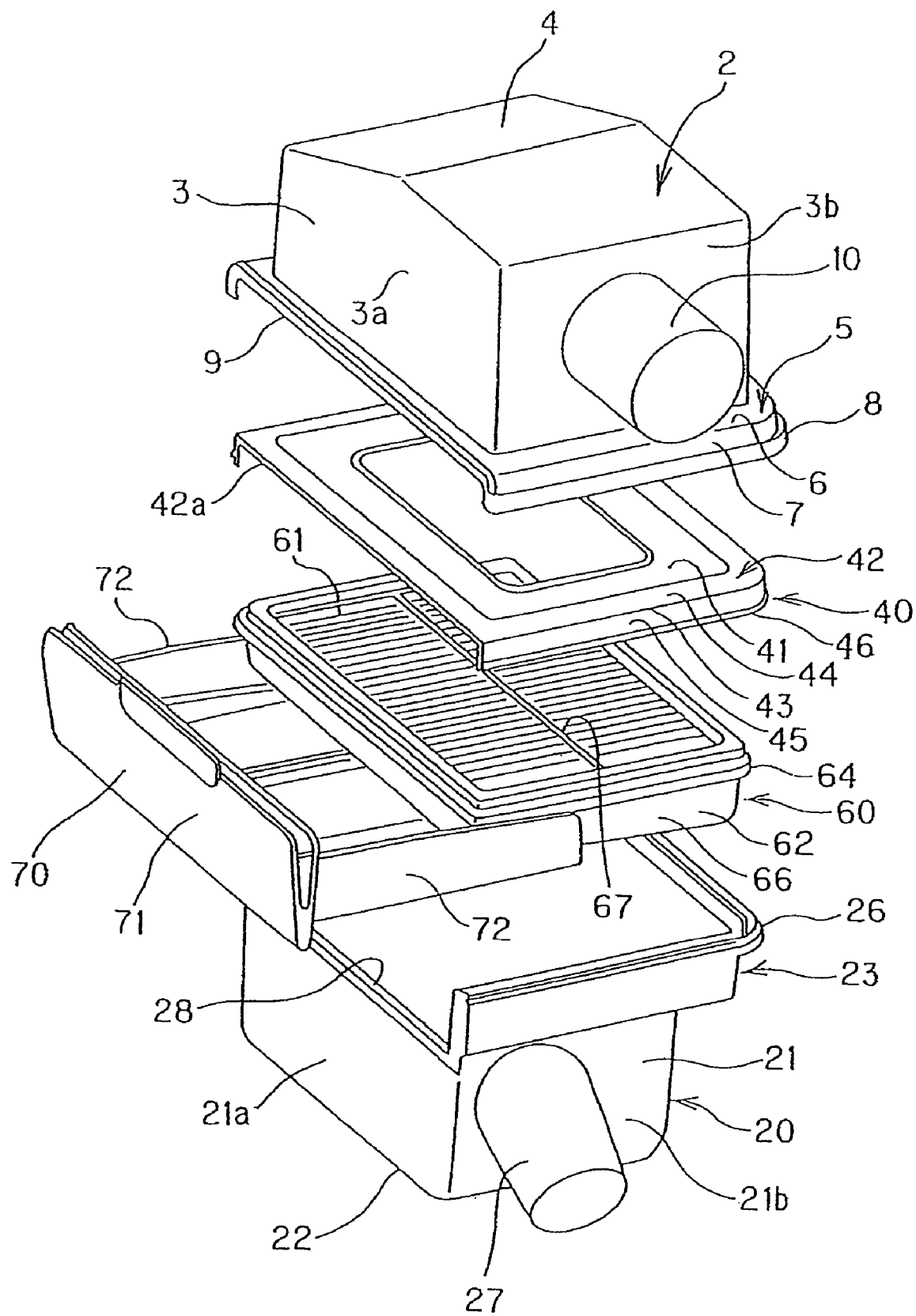
FIG. 1 is an exploded perspective view of an air cleaner.
Figure 2:
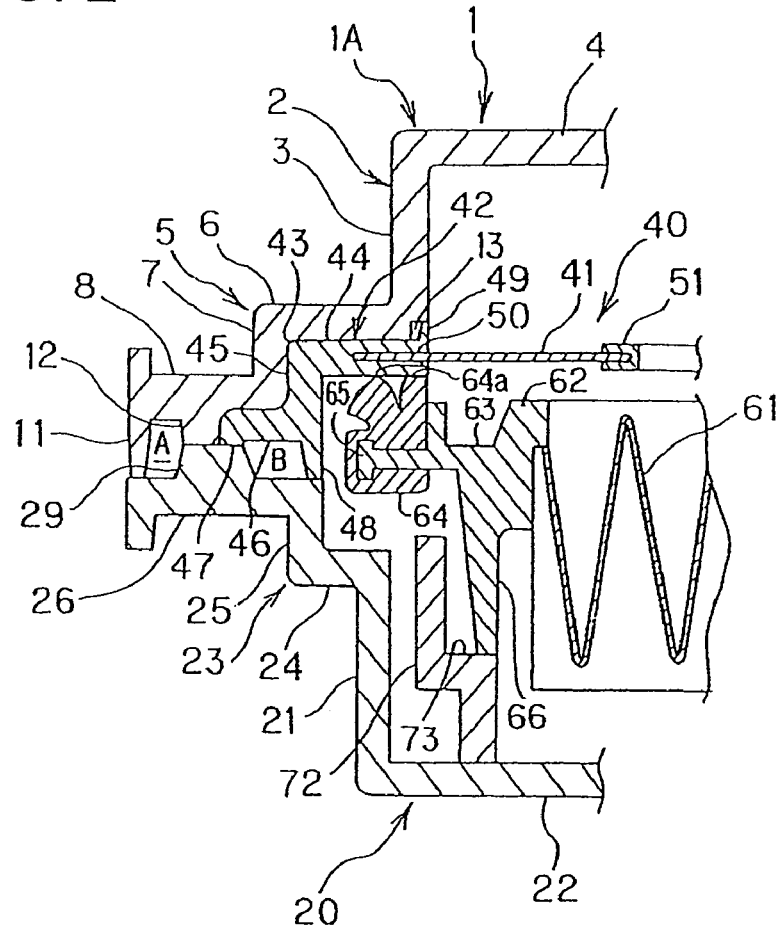
FIG. 2 is a longitudinal sectional view showing a part of an air cleaner.

FIG. 1 is an exploded perspective view of an air cleaner 1 in accordance with a first embodiment of the present invention. FIG. 2 is a longitudinal sectional view showing a part of the air cleaner 1.

The air cleaner 1 includes a housing 1A forming an outer shell and a filter element 60 stored in the housing 1A to filter air flowing in the housing 1A. Also, the air cleaner 1 is provided with a holder 70 for fixing the position of the filter element 60 stored in the housing 1A with respect to the housing 1A so that the holder 70 can be inserted in and drawn from the housing. Further, the air cleaner 1 is provided with an adsorption element 40 for adsorbing a vaporized fuel, which is evaporated and flows into the air cleaner 1 from the engine side, in the housing 1A.

The housing 1A is made up of a pair of housing members 2 and 20. In FIGS. 1 and 2, the housing member arranged on the upper side is the first housing member 2 and forms the clean side of the air cleaner 1, and the housing member arranged on the lower side is the second housing member 20 and forms the dust side thereof. That is to say, in the air cleaner 1, air flows in from the second housing side on the lower side, and filtered air flows out from the first housing side on the upper side.

The first housing member 2 includes a peripheral wall surface 3 consisting of four surfaces and a top surface 4 closing the upper end thereof, and the lower surface thereof is open as an open end. On one surface 3b of the peripheral wall surface 3, an outflow port 10 for allowing filtered air to flow out is formed. On the other hand, the second housing member 20 includes a peripheral wall surface 21 consisting of four surfaces and a bottom surface 22 closing the lower end thereof, and the upper end thereof is open as an open end. On one surface 21b of the peripheral wall surface 21, an inflow port 27 for allowing air to flow in is formed.

The housing 1A is configured so that the open end formed on the lower end of the first housing member 2 and the open end formed on the upper end of the second housing member 20 are lapped on each other, and these open ends are welded to each other in a state in which the open end of one housing member is closed by the other housing member.

In the vicinity of the open end forming the lower surface of the first housing member 2, a projecting portion 5 that projects the peripheral wall surface 3 toward the outside is formed on three surfaces excluding one surface 3a of the four surfaces forming the peripheral wall surface 3. The projecting portion 5 forms an insertion portion in which the peripheral edge of the filter element 60 is disposed, as explained in detail later. The projecting portion 5 is made up of a horizontal surface 6 projecting horizontally toward the outside at a position having a predetermined height from the lower end of the first housing member 2 and a vertical surface 7 that is bent toward the lower end side at the outer peripheral edge of the horizontal surface 6 and is formed so as to cover the outer periphery of the first housing member 2.

In a portion in which the peripheral wall surface 3 of the first housing member 2 and the horizontal surface 6 intersect, a groove 13 having an L-shaped cross section is formed along a ridge line forming the top portion of inner surface. The groove 13 performs a function of confining burrs.

Further, at the lower end of the vertical surface 7, a flange portion 8 projecting toward the outside is formed. On the lower surface of the flange portion 8, namely, on the surface facing to the second housing member 20, a welding protrusion 12 projecting toward the second housing member 20 is formed.

At the outer peripheral edge of the flange portion 8, an outside wall portion 11 is formed over the three surfaces of the peripheral wall surface 3 on which the flange portion 8 is formed. The outside wall portion 11 is formed so as to surround the outside of the welding protrusion 12 with a predetermined distance being provided between the outside wall portion 11 and the welding protrusion 12. The outside wall portion 11 also performs a function of confining burrs, as explained in detail later.

In contrast, in the vicinity of the open end of the remaining one surface, a concave portion 9 is formed in which a middle portion excluding both right and left side portions is depressed toward the upside from the lower end of the first housing member 2. The concave portion 9 is formed as an opening 1B for attaching and detaching the filter element 60.

Similarly, in the vicinity of the open end forming the upper surface of the second housing member 20, on the peripheral wall surface 21 corresponding to the projecting portion 5 of the first housing member 2, a projecting portion 23 that projects the peripheral wall surface 21 toward the outside is formed. The projecting portion 23 is also made up of a horizontal surface 24 projecting horizontally toward the outside at a position that is lowered a predetermined dimension from the upper end of the second housing member 20 and a vertical surface 25 that is bent toward the upper end side at the outer peripheral edge of the horizontal surface 24 and is formed so as to cover the outer periphery of the second housing member 20.

At the upper end of the vertical surface 24, a flange portion 26 projecting toward the outside at the upper end of the vertical surface 25 is formed. In this flange portion 26 as well, a welding protrusion 29 projecting toward the first housing member 2 is formed on the surface facing to the flange portion 8 of the first housing member 2. The welding protrusion 29 is caused to abut on and welded to the welding protrusion 12 formed on the first housing member 2. As shown in FIG. 2, the lower end of the outside wall portion 11 formed in the first housing member 2 abuts on the outer peripheral edge of the flange portion 26. The welding protrusion 29 of the second housing member 20 is formed so as to have a width that is about two times the width of the welding protrusion 12 of the first housing member 2 so that both of the welding protrusion 12 of the first housing member 2 and a welding protrusion 47 of the adsorption element 40, described in detail later, abut on the tip end of the welding protrusion 29.

In a surface 21a of the second housing member 20, which surface 21a corresponds to the surface 3a formed with the concave portion 9 of the first housing member 2, a concave portion is similarly formed in which a middle portion excluding both right and left side portions is depressed toward the downside from the upper end of the second housing member 20. The concave portion 28 of the second housing member 20 is formed as the opening 1B for attaching and detaching the filter element 60 together with the concave portion 9 of the first housing member 2.

Figure 3:
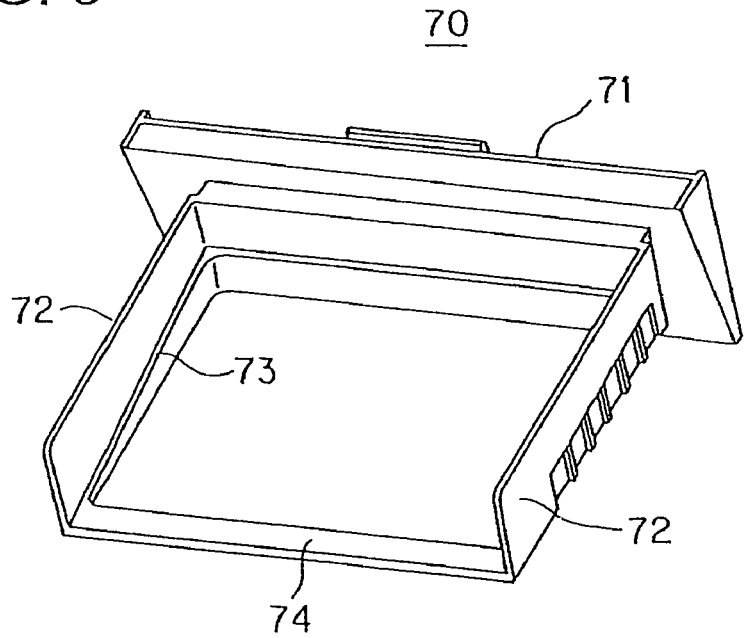
FIG. 3 is a perspective view of a holder.

Further, the air cleaner 2 has the holder 70 shown in FIG. 3. The position of the holder 70 is fixed by pushing the filter element 60 stored in the housing 1A against the housing 1A. The holder 70 includes a lid portion 71 for closing the opening 1B of the housing 1A, a pair of wedge portions 72 that extend perpendicularly to the lid portion 71 and are inserted in the housing 1A, and a connecting portion 74 for connecting both of the wedge portions 72 to each other on the tip end side of the wedge portions 72. The lid portion 71 has a substantially rectangular shape capable of covering the whole of the opening 1B of the housing 1A. In each of the wedge portions 72, a guide surface 73 that tilts so that the height thereof increases from the tip end toward the root is formed on the inner surface facing to each other.

The filter element 60 stored in the housing 1A has a rectangular external shape, and includes a pleated filter medium 61 and a frame 62 for holding the outer peripheral edge of the filter medium 61. On the outer peripheral surface of the frame 62 is mounted a seal packing 64 throughout the entire periphery.

The filter medium 61, which is a member formed by laminating a nonwoven fabric etc., allows air flowing into the air cleaner 1 to pass through to filter the air. The frame 62 for holding the filter medium 61 is formed, for example, by injection molding a resin. The frame 62 is formed with a support leg 66 extending downward and a packing mounting flange 63 projecting to the outside from the outer peripheral surface.

The lower end of a portion forming the side of the support leg 66 tilts so that the height on the opening 1B side of the portion is small and the height on the interior side thereof is large. The lower end of the portion forming the side of the support leg 66 is supported on the guide surface 73 provided on the wedge portion 77 of the holder 70.

On the other hand, the packing mounting flange 63 is a portion on which the seal packing 64 is mounted. At the tip end of the packing mounting flange 63, a stopper 65 projecting to the upside and the downside is formed to prevent the seal packing 64 attached to the packing mounting flange 63 from coming off. The frame 62 of this embodiment is provided with a rib 67 extending in the width direction in the center in the depth direction of the filter element 60. However, this rib 67 is inessential and need not be especially provided.

The seal packing 64 is mounted on the frame 62 by inserting the packing mounting flange 63 in a mounting slit formed on the inside of the seal packing 64 and by bonding the seal packing 64 to the packing mounting flange 63 with an adhesive. In the upper part of the seal packing 64, an interference 64a is formed, and a seal is provided by pressing the interference 64a against the first housing member 2 side. The seal packing 64 of this embodiment is inserted in the insertion portion of the housing 1A, and the interference 64a is pressed against the first housing member 2 side, by which the seal packing 64 seals the joint portion between the first housing member 2 and the second housing member 20.

That is to say, the wedge portion 72 of the holder 70 is provided with the tilting guide surface 73, and on the other hand, the frame 62 of the filter element 60 is provided with the tilting support leg 66 at the lower end thereof. Therefore, when the holder 70 is inserted from the opening 1B, the filter element 60 stored in the housing 1A is pushed up by the guide surface 73, and is gradually pressed against the first housing member 2 side. Thereby, the upper side of the sealing packing 64 is pressed against the back surface of a holding frame 42 of the adsorption element 40. When the upper side of the sealing packing 64 is pressed against the back surface of the holding frame 42, the interference 64a is crushed by the holding frame 42, and thereby the clean side in the housing 1A is sealed. At this time, in a state in which the holder 70 is completely inserted in the housing 1A, the entire periphery of the seal packing 64 is pressed against the holding frame 42 uniformly by the tilt of the guide surface 73 and the tilt of the support leg 66 having a tilt reverse to the tilt of the guide surface 73.

The adsorption element 40 that adsorbs vaporized fuel in the housing 1A is made up of a rectangular adsorbent 41 whose inside is open, the holding frame 42 for holding the outer peripheral edge of the adsorbent 41, and an inner frame 51 provided on the open inside of the adsorbent 41 to hold the adsorbent 41.

The adsorbent 41, which is formed of activated carbon or the like, adsorbs vaporized fuel flowing into the housing 1A through the outflow port 10.

The holding frame 42 is a member formed, for example, by injection molding a resin. In the center in the width direction of the holding frame 42, a bent portion 43 is formed, and a bent surface 45 is formed, the bent surface 45 being bent downward so that the outer side of the bent portion 43 is at almost right angles to the inner side of the bent portion 43. At the outer peripheral edge of the holding frame 42, there are formed a connecting portion 46 projecting to the outside and an inside wall portion 48 projecting further downward. Further, at the tip end of the connecting portion 46, the welding protrusion 47 projecting downward is formed along the peripheral direction of the holding frame 42. However, as is apparent from FIG. 1, on one side corresponding to the opening 1B of the housing 1A, of four sides forming the holding frame 42, the bent surface 45 is not formed, and a concave portion 42a having almost the same shape as that of the concave portion 9 formed in the first housing member is formed.

As shown in FIG. 2, a portion 44 on the inner side of the bent portion 43 is matched with the horizontal surface 6 forming the projecting portion 5 of the first housing member 2, and the bent surface 45 is matched with the vertical surface 7, by which the holding frame 42 is brought into close contact with the inner surface of the projecting portion 5.

The welding protrusion 47 formed in the connecting portion 46 is vibration welded, together with the welding protrusion 12 formed in the flange portion 8 of the first housing member 2, to the welding protrusion 29 formed in the flange portion 26 of the second housing member 20. On the other hand, on the inside of the welding protrusion 29 formed on the second housing member 20, the inside wall portion 48 is formed at a position separating a predetermined distance from the welding protrusion 29 so as to separate the interior of the housing 1A from the portion in which the welding protrusion 29 is formed. By the inside wall portion 48, the welding protrusion 29 of the second housing member 20, the connecting portion 46 formed on the holding frame 42, and the flange portion 26 of the second housing member 20, a closed space B is formed. The inside wall portion 48 performs a function of confining burrs, and burrs produced at the time of vibration welding are accumulated in the space B.

On the other hand, at the inner edge of the holding frame 42, a holding groove 50 is formed in the center in the thickness direction. The holding groove 50 accommodates the outer edge of the adsorbent 41 therein, and holds the outer peripheral edge of the adsorbent 41. Also, at the inner edge of the holding frame 42, a protrusion 49 projecting upward is formed. The protrusion 49 is formed along the inner edge of the holding frame 42, and the height thereof is consistent with the depth of the groove 13 having an L-shaped cross section, which is formed in the inner surface of the first housing member 2. When the adsorption element 40 is attached to the housing 1A, the protrusion 49 performs a function of confining burrs together with the groove in the first housing member 2.

In the air cleaner 1 configured as described above, on the outside of the welding protrusions 12, 29 and 47, a closed space A is formed by the outside wall portion 11 functioning to confine burrs, the flange portion 8, and the flange portion 26 of the second housing member, so that burrs produced at the time of vibration welding are accumulated in the space A. Also, on the inside of the welding protrusions 12, 29 and 47, the closed space B is formed by the welding protrusions 12 and 47, the inside wall portion 48 functioning to confine burrs, the connecting portion 46 of the holding frame 42, and the flange portion 26 of the second housing member, so that burrs produced at the time of vibration welding are accumulated in the space B.

As shown in FIG. 2, the protrusion 49 formed at the inner edge of the holding frame 42 of the adsorption element 40 also performs a function of confining burrs. Specifically, even in the case where burrs pass through between the projecting portion 5 formed on the first housing member 2 and the holding frame 42 at the time of vibration welding, the protrusion 49 prevents burrs from intruding into the housing 1A. The burrs having passed through are accumulated in a small space formed by the protrusion 49 and the groove 13 in the first housing member 2.

The air cleaner 1 is manufactured as described below.

Figure 4:
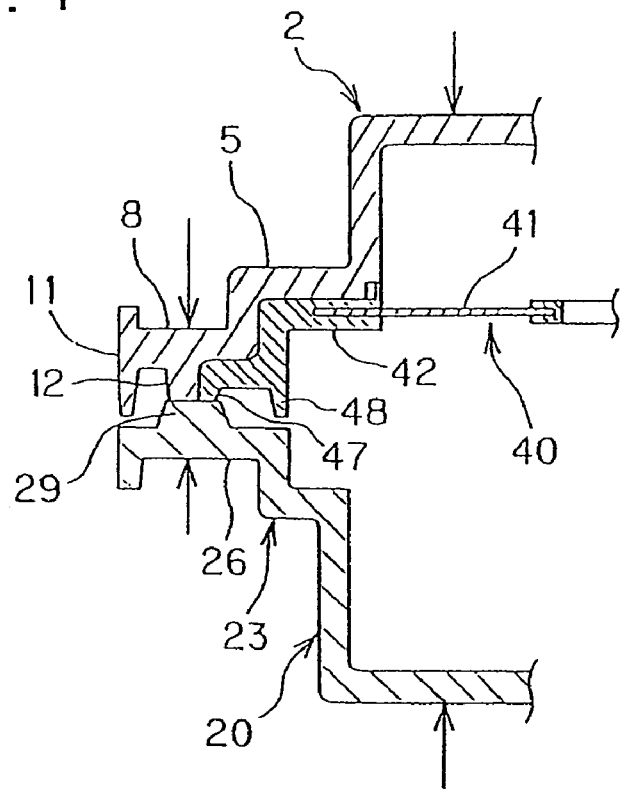
FIG. 4 is a partial view showing the states of a first housing member, a second housing member, and an absorption element before they are vibration welded.

First, as shown in FIG. 4, the adsorption element 40 is fitted on the inside of the first housing member 2. At this time, the bent potion 43 formed on the holding frame 42 of the adsorption element 40 is caused to coincide with the boundary between the horizontal surface 6 and the vertical surface 7 in the projecting portion 5 of the first housing member 2, and the portion 44 on the inner side of the bent portion 43 is brought into close contact with the inner surface of the horizontal surface 6, and the bent surface 45 is brought into close contact with the inner surface of the vertical surface 7.

Next, the open end of the first housing member 2 and the open end of the second housing member 20 are lapped on each other, and each open end is closed by the other housing member 2, 20. At this time, both of the tip end of the welding protrusion 12 formed in the flange portion 8 of the first housing member 2 and the tip end of the welding protrusion 47 formed in the connecting portion 46 of the holding frame 42 are caused to abut on the tip end of the welding protrusion 29 formed in the flange portion 26 of the second housing member 20.

Next, a force for pressing both of the housing members 2 and 20 against each other to clamp both the members is applied to the housing members 2 and 20. At the same time, the first housing member 2 in which the adsorption element 40 has been fitted and the second housing member 20 are vibrated so that both of the members slide in the horizontal direction. For example, the position of the first housing member 2 in which the adsorption element 40 has been fitted is fixed, and the second housing member 20 is vibrated with respect to the first housing member 2 and the adsorption element 40. Thereby, frictional heat is generated between the welding protrusion 12 of the first housing member 2 and the welding protrusion 29 of the second housing member 20 and between the welding protrusion 47 of the holding frame 42 and the welding protrusion 29 of the second housing member 20. The welding protrusions 12, 29 and 47 are heat welded by the frictional heat, and thereby the first housing member 2 and the second housing member 20 are integrated, and also the holding frame 42 of the adsorption element 40 and the second housing member 20 are integrated.

Figure 5:
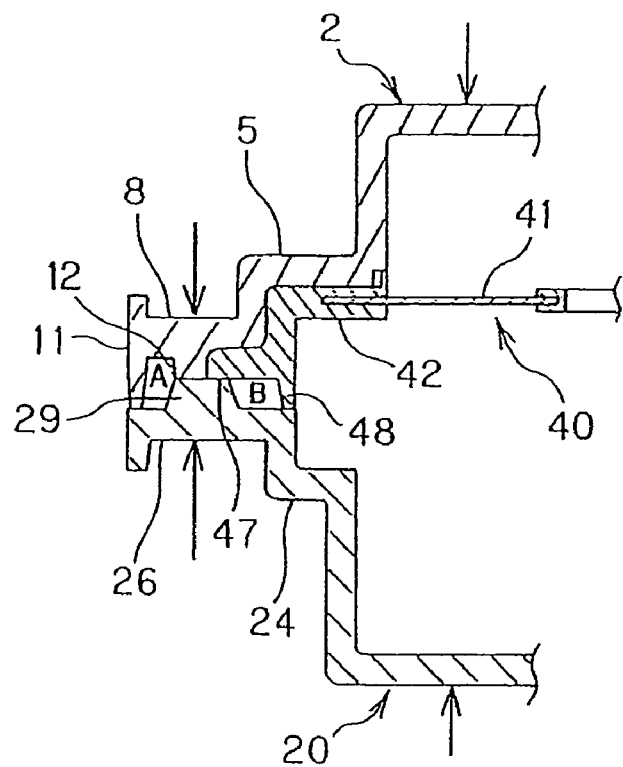
FIG. 5 is a partial view showing the states of a first housing member, a second housing member, and an absorption element after they have been vibration welded.
Figure 6:
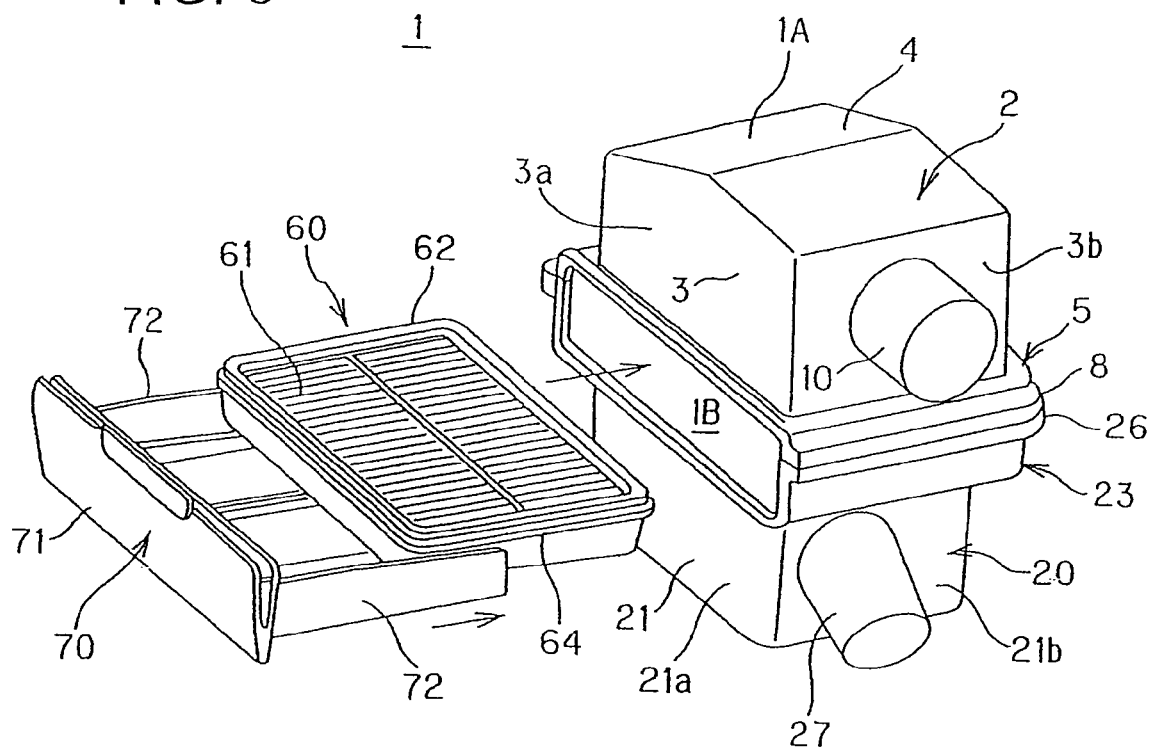
FIG. 6 is a perspective view of an air cleaner showing a state before a filter element is mounted in a completed housing.

The step of vibration welding is carried out until the welding protrusions 12, 29 and 47 are melted appropriately, and thereby the tip end of the outside wall portion 11 and the tip end of the inside wall portion 48 abut on the flange portion 26 of the second housing member 20 as shown in FIG. 5.

When the welding protrusions 12, 29 and 47 are melted by the frictional heat, burrs are produced accordingly from the welding protrusions 12, 29 and 47. However, the air cleaner 1 is provided with the inside wall portion 48 on the inside of the welding protrusion 12. As described above, the inside wall portion 48 separates the position at which the welding protrusion 12 is provided from the interior of the housing 1A, so that the inside wall portion 48 performs a function of confining burrs. Therefore, the burrs produced at the time of vibration welding are prevented from scattering in the housing 1A by the inside wall portion 48. The burrs produced are accumulated in the space B. Similarly, the outside wall portion 11 provided on the outer side of the welding protrusion 12 also performs a function of confining burrs, and prevents the burrs produced at the time of vibration welding from scattering to the outside of the housing 1A. The burrs produced are accumulated in the space A.

As described above, when the first housing member 2, the second housing member 20, and the adsorption element 40 are integrated by vibration welding, the housing 1A is completed in which the opening 1B is formed in one surface 3a, 21a of the four peripheral wall surfaces 3, 21. Then, the filter element 60 is stored in the housing 1A from the opening 1B, and subsequently the holder 70 is inserted through the opening 1B in the same way. When the holder 70 is inserted, the filter element 60 is pushed up gradually to the first housing member 2 on the upper side by the guide surfaces 73 formed on the inner surfaces of the wedge portions 72 of the holder 70.

As described above, the guide surface 73 formed in the wedge portion 72 of the holder 70 is formed so that the opening 1B side is high, and tilts downward slantwise toward the tip end. On the other hand, the support leg 66 formed on the frame 62 of the filter element 60 is formed so that the height on the interior side thereof is large and the height on the opening 1B side is small. That is to say, the directions of tilts of the guide surface 73 and the support leg 66 are reverse to each other. Therefore, when the holder 70 is inserted completely, the seal packing 64 provided around the filter element 60 is pushed against the back surface of the holding frame 42 of the adsorption element 40 by a force that is uniform throughout the entire periphery.

On the other hand, the lid portion 71 of the holder 70 closes the opening 1B. Thereby, the air cleaner 1 is completed. In this embodiment, both of the inside wall portion 48 and the outside wall portion 11 are provided on the first housing member 2. However, the configuration is not limited to this one.

Figure 7:
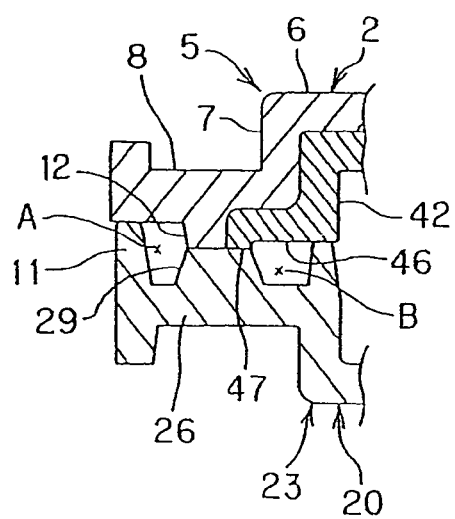
FIG. 7 is a longitudinal sectional view of a part of an air cleaner formed with an outside wall portion and an inside wall portion in a different way from the air cleaner shown in FIG. 2.

FIG. 7 shows the air cleaner 1 in accordance with an embodiment different from the embodiment shown in FIG. 2. In the air cleaner 1 shown in FIG. 7, the outside wall portion 11 is provided in the outer edge portion of the flange portion of the second housing member 20, and the tip end thereof is formed so as to extend to the flange portion of the first housing member 2. Also, the inside wall portion 48 is provided in the inner edge portion of the flange portion of the second housing member 20, and the tip end thereof is formed so as to abut on the holding frame 42 of the adsorption element 40.

Even if the wall portions 11 and 48 are provided on the outer side and the inner side of the welding protrusions 12, 29 and 47, respectively, in this manner, the wall portions 11 and 48 perform a function of confining burrs, and surely prevent the burrs produced at the time of vibration welding from scattering to the inside and outside of the housing 1A.

Second Embodiment

Figure 8:
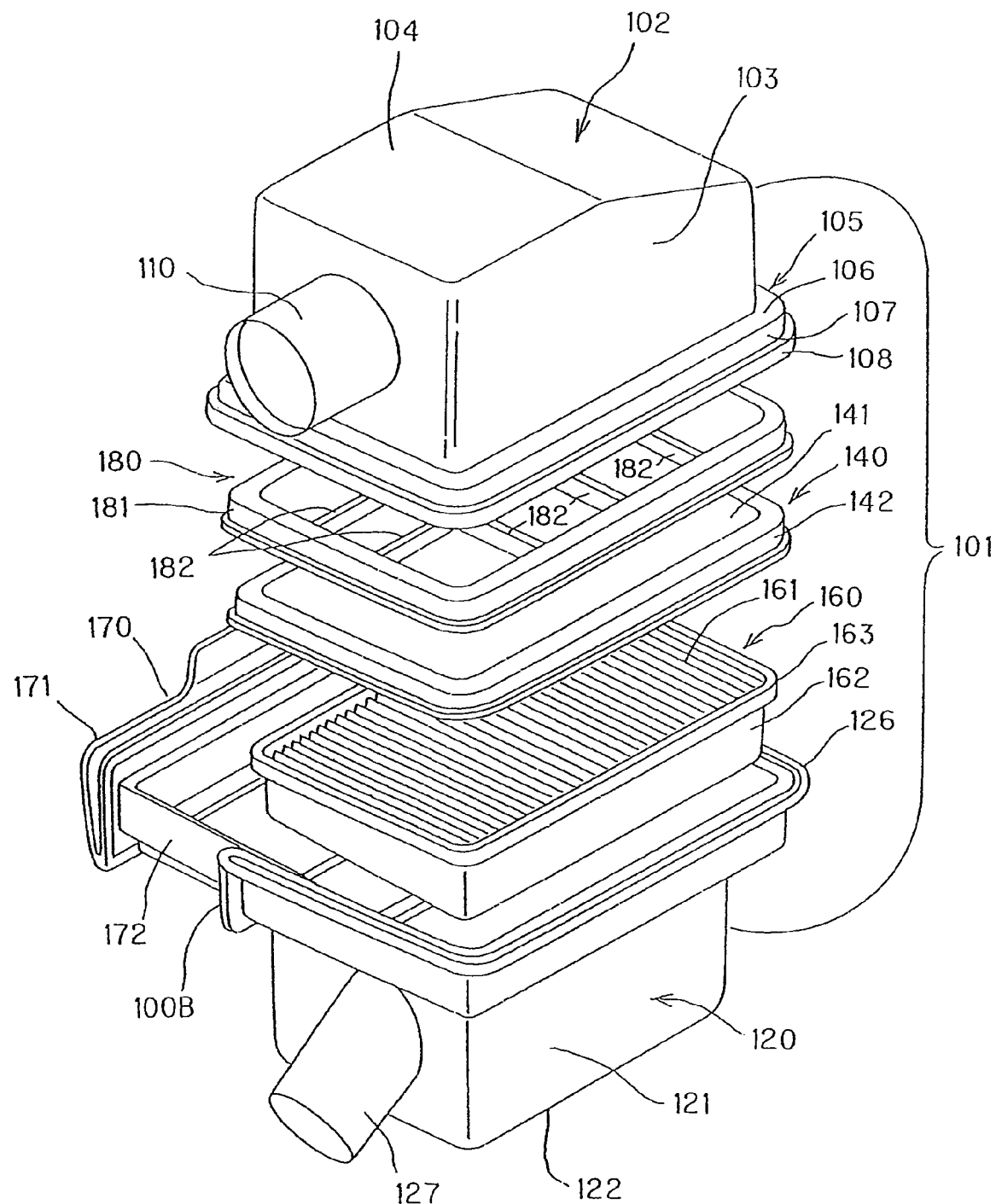
FIG. 8 is an exploded perspective view of an air cleaner in accordance with a second embodiment.
Figure 9:
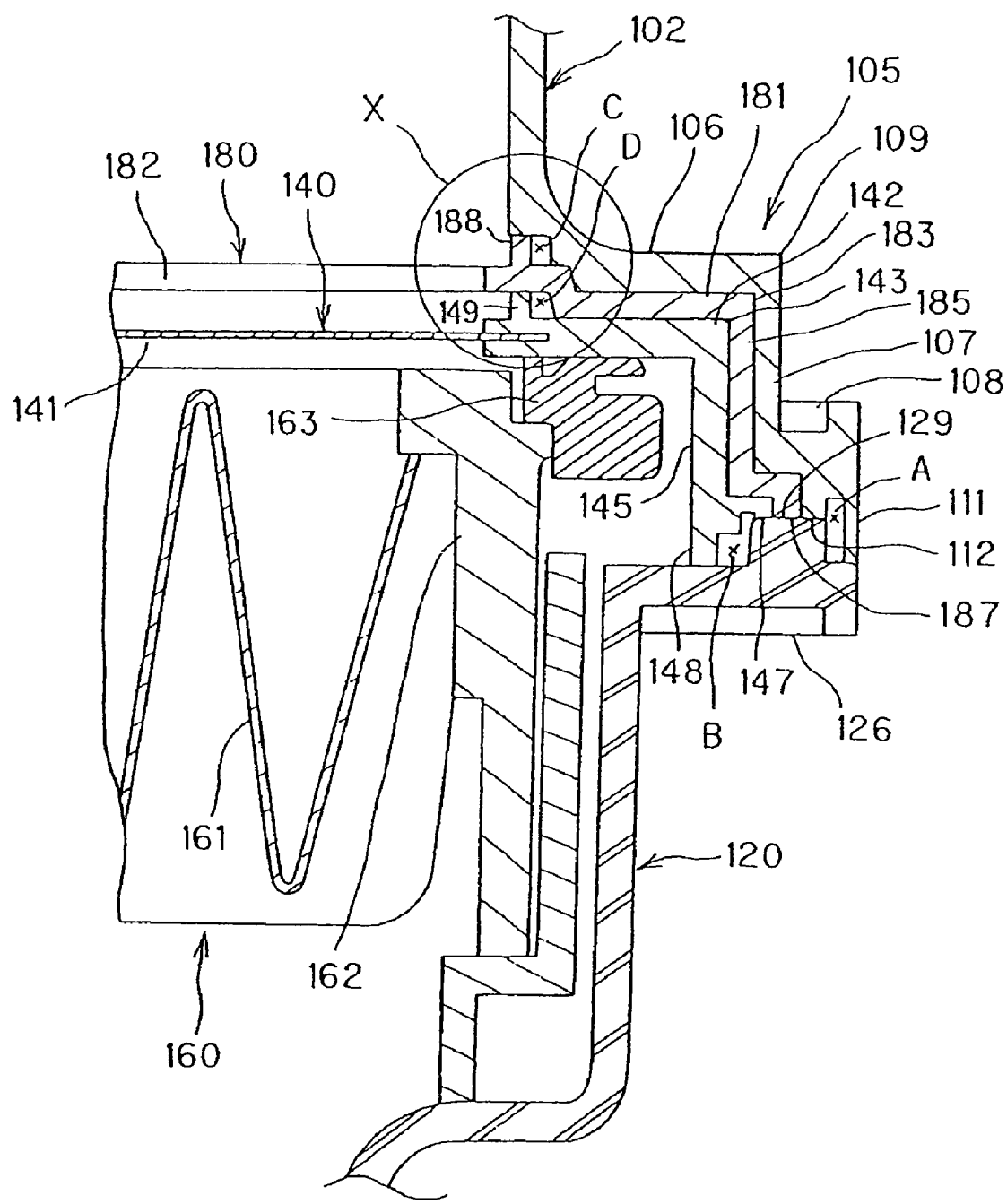
FIG. 9 is a longitudinal sectional view of a part of an air cleaner.

FIGS. 8 and 9 show an air cleaner 100 in accordance with a second embodiment of the present invention.

The air cleaner 100 in accordance with this embodiment has a support member 180 for preventing an adsorption element 140 from deflecting.

FIG. 8 is an exploded perspective view of the air cleaner 100. The air cleaner 100 has a housing 101 forming an outer shell and a filter element 160 stored in the housing 101. The housing 101 is configured by joining a first housing member 102 forming the upper part of the housing 101 and a second housing member 120 forming the lower part thereof. The first housing member 102 includes a peripheral wall surface 103 and a top surface 104, and the lower part thereof is open. Also, the second housing member 120 includes a peripheral wall surface 121 and a bottom surface 122. In this air cleaner 100 as well, the upper side of the housing 101, formed by the first housing member 102, is the clean side, and the lower side of the housing 101, formed by the second housing member 120, is the dust side. Also, in the peripheral wall surface 103 of the first housing member 102, an outflow port 110 is provided, and in the peripheral wall surface 121 of the second housing member 120, an inflow port 127 is provided. Further, in the joint portion between the first housing member 102 and the second housing member 120, an opening 100B is formed in one surface of the peripheral wall surfaces 103 and 121 of the housing 101. The opening 100B is used to insert the filter element 160 into the housing 101.

The filter element 160 includes a frame 162 forming the peripheral edge portion thereof and a pleated filter medium 161 arranged on the inside of the frame 162. Also, on the outer surface of the frame 162 is mounted a packing 163 throughout the entire periphery. As in the air cleaner 100 of the first embodiment, the filter element 160 is configured so as to be inserted from the opening 100B by the holder 170 and is stored in the housing 101. The construction of the holder 170, the procedure for inserting the filter element 160 into the housing 101 by using the holder 170, and the like are the same as those in the air cleaner 100 in accordance with the first embodiment, so that the explanation thereof is omitted here. Also, the second embodiment is the same as the first embodiment in that the filter element 160 is held in the housing 101 by utilizing wedge portions 172 of the holder and that a lid portion 171 closes the opening 100B. The filter element 160 is not provided with a rib on the inside of the frame 162. However, the rib may be provided as in the case of the first embodiment.

In the first housing member 102 forming the clean side, the adsorption element 140 and the support member 180 are provided in such a manner as to be lapped on each other. The adsorption element 140 is made up of a holding frame 142 forming the peripheral edge thereof and an adsorbing portion 141 that is arranged on the inside of the holding frame 142 and is held by the holding member 142. The adsorbing portion 141 is configured so as to close the entire surface on the inside of the holding frame 142, and no opening is formed in the central portion of the adsorbing portion 141. On the other hand, the support member 180 is made up of a frame portion 181 forming the peripheral edge portion and a plurality of ribs 182 extending in the longitudinal and transverse directions on the inside of the frame portion 181. The support member 180 is configured so that the ribs 182 support the adsorbing portion 141 by lapping the support member 180 on the adsorption element 140 to prevent the adsorbing portion 141 from being deflected to the downstream side by the flow of air.

In the air cleaner 100, four members of the first and second housing members 102 and 120, the adsorption element 140, and the support member 180 are integrated by vibration welding. FIG. 9 shows the details of the joint portion between the first and second housing members 102 and 120, which is a portion in which the four members are vibration welded.

At the peripheral edge of the second housing member 120 is formed a flange portion 126 projecting to the outside, and on the upper surface thereof is formed a welding protrusion 129 projecting upward. The flange portion 126 is formed on three surfaces excluding the surface in which the aforementioned opening 100B is formed, of the peripheral edges of the second housing member 120. The welding protrusion 129 is formed over the total length of the flange portion 126.

On the other hand, in the first housing member 102 forming the upper part of the housing 101, the support member 180 and the adsorption element 140 are arranged by being lapped on each other with the support member 180 being positioned on the interior side of the first housing member 102. In the vicinity of the open end of the first housing member 102 as well, on three surfaces of the peripheral wall surface 103, a projecting portion 105 projecting outward is formed. This projecting portion 105 is also made up of a horizontal surface 106 projecting horizontally and a vertical surface 107 extending downward at the outer peripheral edge of the horizontal surface 106. Further, at the lower end of the vertical surface 107, a flange portion 108 projecting outward is formed.

On the lower surface of the flange portion 108, a welding protrusion 112 projecting toward the second housing member 120 is formed. Also, at the outer peripheral edge of the flange portion 108, an outside wall portion 111 is formed so as to surround the outside of the welding protrusions 112 and 129 with a predetermined distance being provided between the outside wall portion 111 and the welding protrusions 112 and 129. The tip end of the outside wall portion 111 abuts on the flange portion 126 of the second housing member 120, by which a closed space A is formed between the outside wall portion 111 and the welding protrusions 112 and 129. Therefore, the outside wall portion 111 also performs a function of confining burrs when vibration welding is performed.

The adsorption element 140 and the support member 180 are arranged so as to be fitted on the inside of the projecting portion 105 of the first housing member 102. Both of the frame portion 181 forming the peripheral edge of the support member 180 and the holding frame 142 of the adsorption element 140 are formed with bent portions 143 and 183, respectively, in an intermediate portion in the width direction thereof, so that outer edges 145 and 185 are directed to the flange portion 126 of the second housing member 120. The support member 180 and the adsorption element 140 are arranged on the inside of the projecting portion 105 so that the bent portions thereof coincide with a bent portion 109 that is a boundary line between the horizontal surface 106 and the vertical surface 107 in the projecting portion 105.

The outer peripheral edge of the frame portion 181 of the support member 180 projects outward along the flange portion 108, and at the tip end thereof, a welding protrusion 187 projects toward the welding protrusion 129 of the second housing member 120. The outer surface of the welding protrusion 187 is in close contact with the inner surface of the welding protrusion 112 formed on the first housing member 102. On the other hand, the outer peripheral edge of the holding frame 142 of the adsorption element 140 is forked into two parts; the outside is formed as a welding protrusion 147, and the inside is formed as an inside wall portion 148. Explaining in more detail, the outside part projects outward, and the tip end thereof is formed with the welding protrusion 147 projecting toward the welding protrusion 129 of the second housing member 120. The outer surface of the outside part is in close contact with the inner surface of the support member 180. On the other hand, at the tip end of the holding frame 142, a part on the inner side of the inside part projects toward a portion on the inside of the welding protrusion 129 in the flange portion of the second housing member 120. This projecting part is the inside wall portion 148. The inside wall portion 148 is also formed so as to be parallel with the welding protrusions 129 and 147 with a fixed distance being provided between the inside wall portion 148 and the welding protrusions 129 and 147. The inside wall portion 148 forms a space B together with the welding protrusions 129 and 147, and performs a function of confining burrs when vibration welding is performed.

Thus, in the joint portion between the first housing member 102 and the second housing member 120, the welding protrusion 112 of the first housing member 102, the welding protrusion 187 of the support member 180, and the welding protrusion 147 of the adsorption element 140 project toward the welding protrusion 129 of the second housing member 120 in a lapped state in the named order from the outside of the housing 101. Also, on the outside of the welding protrusion 112 of the first housing element 102, the outside wall portion 111 is provided, and on the inside of the welding protrusion 147 of the adsorption element 140, the inside wall portion 148 is provided. The welding protrusions 112, 129, 147 and 187 are surrounded by the outside wall portion 111 and the inside wall portion 148. Therefore, the burrs produced at the time of vibration welding remain in the spaces A and B formed between the outside wall portion 111 and the inside wall portion 148, and thereby the burrs are surely prevented from scattering. As is apparent from FIG. 9, the thickness dimension of the welding protrusion 129 of the second housing member 120 is approximately equal to a sum of thickness dimensions of the welding protrusions 112, 148 and 187 formed on the first housing member 102, the support member 180, and the adsorption element 140, respectively.

In the air cleaner 100 of this embodiment, as indicated by an encircled portion X, on the upper surface of the inner edge portion of the frame portion 181 of the support member 180, a protrusion 188 projecting toward the inner surface of the first housing member 102 is formed along the inner edge portion of the frame portion 181. On the other hand, on the inner surface of the first housing member 102, a groove is formed at a position corresponding to the protrusion 188. The upper end of the protrusion 188 abuts on the inner surface of the first housing member 102 at the position of this groove. Therefore, a space C is formed by the protrusion, the upper surface of the frame portion 181, and the inner surface of the groove. Similarly, in the inner edge portion of the holding frame 142 of the adsorption element 140, a protrusion 149 projects toward the frame portion 181 of the support member 180. Therefore, a space D is formed on the inside surrounded by the protrusion 149, the holding frame 142 of the adsorption element 140, and the support member 180.

These spaces C and D perform a function of confining burrs so that even if the burrs produced at the time of vibration welding pass between the first housing member 102 and the support member 180 and between the support member 180 and the adsorption element 140, the burrs are prevented from intruding into the housing 101.

According to the air cleaner 100 configured as described above, when air is sucked, the air having passed through the filter element 160 successively passes through the adsorbing portion 141 of the adsorption element 140. At this time, by the pressure of air, the adsorbing portion 141 is subjected to a force for pushing away the adsorbing portion 141 toward the first housing member 102 on the upper side. However, since the ribs 182 of the support member 180 supports the adsorbing portion 141, the adsorbing portion 141 is effectively prevented from deflecting greatly to the first housing member 102 side.

When the engine is stopped, the vaporized fuel flowing into the housing 101 from the engine side is adsorbed by the adsorbing portion 141 of the adsorption element 140, and thereby the vaporized fuel is prevented from leaking further to the upstream side. In particular, in the air cleaner 100 in accordance with the second embodiment, since the adsorbing portion 141 covers the whole surface, the vaporized fuel having flown into the housing 101 cannot move further to the upstream side unless it passes through the adsorbing portion 141. Therefore, the adsorbing portion 141 surely adsorbs vaporized fuel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An air cleaner comprising:
a housing including first and second housing members each formed with an open end and being configured so that each of the open ends are closed by being joined to each other, the open end of each of the first and second housing members having a flange portion, each flange portion projecting to the outside of a respective housing member and being mutually lapped, and the flange portions of the first and second housing members facing each other; and
a filter element for filtering air taken into the housing, the filter element being assembled so as to partition an interior of the first and second housing members into regions,
wherein an adsorption element for adsorbing vaporized fuel flowing in from an engine side is arranged on a side of the first housing member relative to the filter element in the housing, so as to face to the filter element, the adsorption element including an adsorbent for adsorbing the vaporized fuel and a holding frame for holding an outer peripheral edge of the adsorbent element;

wherein a welding protrusion is disposed at the flange portion of the open end of each of the first and second housing members, the welding protrusion of each of the first and second housing members being disposed between the flange portions of the first and second housing members, and projecting toward the flange portion of the open end of the other of the first and second housing member;

wherein the holding frame has a connecting portion provided thereon, the connecting portion being disposed between the flange portions of the first and second housing members, the connecting portion having a welding protrusion disposed between the flange portions of the first and second housing members, projecting toward the flange portion of the second housing member, and abutting the welding protrusion of the second housing member on a reverse side of the holding frame to a side on which the adsorption element is arranged via the filter element; and wherein each of the welding protrusions of the first and second housing members abuts the other welding protrusion of the first and second housing members, and the welding protrusion of the connecting portion abuts the welding protrusion of the second housing member on the reverse side to the adsorption element, whereby each of the welding protrusions are vibration welded so that the housing and the adsorption element are formed integrally.

2. The air cleaner according to claim 1, wherein the welding protrusions of the first and second housing members and the welding protrusion of the connecting portion, which are welded and integrated, are formed so as to extend in a predetermined distance on an inside and an outside thereof, and are surrounded by a wall portion for preventing burrs produced by vibration welding of the welding protrusions from scattering.

3. The air cleaner according to claim 1, wherein one of the flange portions has an outside wall portion disposed at a position that is a predetermined distance from the outside of the welding protrusions of the first and second housing members and the welding protrusion of the adsorption element, which are welded and integrated, the outside wall portion projecting toward the other flange portion and preventing burrs from scattering;

the holding frame of the adsorption element has an inside wall portion disposed at a position that is a predetermined distance from the inside of the welding protrusions of the first and second housing members and the welding protrusion of the adsorption element, which are welded and integrated, the inside wall portion projecting toward the flange portion of the second housing member on the reverse side of the housing element on which the adsorption element is arranged, and preventing burrs produced by vibration welding of the welding protrusions from scattering; and the outside wall portion surrounds the outside of the welding protrusions, whereby a space is formed which is closed by the outside wall portion, the welding protrusions, and the flange portions, and the inside wall portion surrounds the inside of the welding protrusions, whereby a space is formed which is closed by the inside wall portion, the welding protrusions, the connecting portion of the holding frame, and the flange portion.

4. The air cleaner according to claim 3, wherein in a vicinity of the open end of each of the first and second housing members, each of the first and second housing members includes a projecting portion that is a peripheral wall surface projecting from a respective one of each of the first and second housing members to the outside thereof, the projecting portion of each housing member being a horizontal surface extending from the peripheral wall surface toward the outside and a vertical surface extending toward the other housing member of the first and second housing members at an outside edge of the horizontal surface, the projecting portions being combined and an interior thereof is configured as an insertion portion in which a peripheral edge portion of the filter element is inserted;

the flange portion of each of the first and second housing members is formed at a tip end of the vertical surface of the first and second housing members, respectively;

the holding frame of the adsorption element is configured so that a bent surface formed by bending an outer peripheral edge thereof is formed along a peripheral direction of the adsorption element and is in close contact with an inner surface of the insertion portion; and at a tip end of the bent surface, the connecting portion which projects further outward and is formed with the welding protrusion at a tip end thereof and the inside wall portion which extends toward the flange portion of the second housing member on the inside of the welding protrusion of the second housing member on a reverse side to the side on which the adsorption element is arranged are formed.

5. The air cleaner according to claim 1, wherein in the first housing member in which the adsorption element is arranged, a support member which is lapped on the adsorption element and supports the adsorbent is disposed so as to be located on an interior side of the adsorption element.

6. The air cleaner according to claim 5, wherein the support member has a peripheral edge, and a welding protrusion is disposed at the peripheral edge and projects toward the second housing member on a side reverse to the first housing member on which the support member is arranged, and the welding protrusion of the support member is configured to be held between the welding protrusion formed on the first housing member on a side on which the support member is arranged and the welding protrusion formed on the holding frame of the adsorption element.

7. The air cleaner according to claim 2, wherein in the first housing member in which the adsorption element is arranged, a support member which is lapped on the adsorption element and supports the adsorbent is provided so as to be located on an interior side of the adsorption element.

8. The air cleaner according to claim 3, wherein in the first housing member in which the adsorption element is arranged, a support member which is lapped on the adsorption element and supports the adsorbent is provided so as to be located on an interior side of the adsorption element.

9. The air cleaner according to claim 4, wherein in the first housing member in which the adsorption element is arranged, a support member which is lapped on the adsorption element and supports the adsorbent is provided so as to be located on an interior side of the adsorption element.

* * * * *